United States Patent [19]
Barna

[11] Patent Number: 4,823,601
[45] Date of Patent: Apr. 25, 1989

[54] VIBRATION SENSING METHOD AND APPARATUS

[75] Inventor: Basil A. Barna, Idaho Falls, Id.

[73] Assignee: The United States of America as represented by the United States Department of Energy, Washington, D.C.

[21] Appl. No.: 70,763

[22] Filed: Jul. 7, 1987

[51] Int. Cl.⁴ ............................................. G01M 7/00
[52] U.S. Cl. ......................................... 73/594; 73/657
[58] Field of Search ................. 73/594, 655, 657, 662; 356/352, 356, 358; 372/92, 97

[56] References Cited

U.S. PATENT DOCUMENTS

| | | | |
|---|---|---|---|
| 3,124,099 | 3/1964 | Skilling | 73/662 |
| 4,452,533 | 6/1984 | Miles et al. | 356/352 |
| 4,644,556 | 2/1987 | Petuchowski et al. | 372/87 |

OTHER PUBLICATIONS

Laser Displacement Sensor . . . M. Weksler et al., Applied Optics, Aug. 15, 1980 vol. 19 No. 16.

Primary Examiner—Stewart J. Levy
Assistant Examiner—Louis M. Arana
Attorney, Agent, or Firm—Michael Higgins; Frank J. Kozak; Judson R. Hightower

[57] ABSTRACT

A method and apparatus for nondestructive evaluation of a structure is disclosed. Resonant audio frequency vibrations are excited in the structure to be evaluated and the vibrations are measured and characterized to obtain information about the structure. The vibrations are measured and characterized by reflecting a laser beam from the vibrating structure and directing a substantial portion of the reflected beam back into the laser device used to produce the beam which device is capable of producing an electric signal containing information about the vibration.

11 Claims, 4 Drawing Sheets

VIBRATION SENSING METHOD AND APPARATUS

CONTRACTUAL ORIGIN OF THE INVENTION

The U.S. Government has rights in this invention pursuant to Contract No. DE-AC07-76ID01570 between the U.S. Government and EG&G Idaho, Inc.

BACKGROUND OF THE INVENTION

This invention relates to a method and apparatus for nondestructive evaluation of structures and more particularly to a method and apparatus for remotely exciting vibrations in a structure to be evaluated and remotely measuring and analyzing the vibrations to obtain data related to physical attributes of the structure.

It is often necessary to evaluate engineering structures non-destructively either after such structures are built as a quality control inspection or after some period of service, particularly where the service is rigorous and the structures are critical to environmental or personnel safety thus requiring reliability assurance. Typical of non-destructive evaluation (NDE) technologies are ultrasonics, eddy current techniques, radiographics and acoustic emission analysis. Each of these and other conventional NDE techniques are applicable to particular types of structures and particular types of evaluations. In a situation where one technique is efficacious others may not be and there are situations where none of the conventional techniques is adequate. An example of such situation is the need to evaluate nondestructively the bond integrity of the thermal protection system of the space shuttle orbiter.

The thermal protection system comprises fiber composite tiles bonded to flexible strain isolation pads which, in turn, are bonded to the outer surface of the orbiter. Repeated missions in hostile environments can cause degradation of the bond integrity through heat and moisture. Due to the unique nature of the fiber composite tiles and flexible strain isolation pads between the protective tiles and the space shuttle orbiter, conventional NDE techniques have proven inadequate. In any case, most of the conventional techniques involve physical contact with the structure being evaluated and evaluate relatively small areas on the structure. To reliably verify the integrity of more than 30,000 tiles on an in-service space shuttle orbiter, an evaluation approach that can make measurements rapidly and remotely is desirable. The present invention is addressed to the problem of remote NDE.

According to the present invention, the structure to be evaluated such as a heat-protective tile bonded to the surface of a space shuttle orbiter, is excited to a resonant vibrational mode by an audible acoustic signal. The vibrational mode is analyzed to obtain information relative to the integrity of the bond. A significant element of this analysis and thus a significant aspect of the novelty of the present invention, is the method and apparatus used for measuring and characterizing the vibration.

Prior art methods of measuring and characterizing vibration include accelerometers, which are glued to the surface of the structure being evaluated. Clearly, the accelerometer does not provide the remote sensing capabilities that are desired.

A prior art, non-contacting vibration measurement technique is image dissector tube technology. This is a well developed technology in which the image of an edge of an object is tracked as it vibrates to generate the displacement signal. An image of the edge is formed on an input screen which generates photoelectrons which can then be steered with deflection plates to maintain a constant position of the edge on an output phosphorous screen. Any deviation in the position of the edge output image can then be sensed to generate an error signal which is fed to deflection plates to bring the edge back to the reference position. The error signal is proportional to the edge displacement. This technology has several shortcomings which preclude its use for tile vibration measurement. Most significant, the vibrations of interest are of such small amplitude that the image dissector tube does not provide a sufficient signal to noise ratio. In addition, measurements of out of plane displacements require the tube to be at an angle with respect to the displacement vector. There is an additional problem of being restricted to measuring at an edge rather having the capability to measure an arbitrary point of the tile.

Another prior art means for measuring vibrations is a fiber optic sensor which measures the displacement of the surface by monitoring the intensity of light which is emitted from one fiber or fiber bundle, reflected off a vibrating surface and received by a second fiber or fiber bundle. Since the vibration of the surface affects the amount of light deflected from transmitting to receiving fibers, a measurement can be made of the surfaces displacement down to submicrometer levels at band widths up to 70 KHz. The major drawbacks of this technology are extremely small standoff distances (typically less than 0.1 mm) to achieve adequate sensitivity and an inability to obtain an adequate sensitivity with a diffuse and somewhat variable surface, such as found on the orbiter tiles.

Another technology for measuring vibrations that has been described in the literature is optical heterodyning. Optical heterodyning makes use of the fact that a laser beam reflected off a vibrating surface will be frequency shifted by the surface movement. By causing the frequency shifted reflected beam to interfere with a reference beam, a beat frequency signal is obtained whose phase or instantaneous frequency shift follows the surface vibration. Suitable demodulation electronics can then be used to extract a signal indicative of the velocity and/or displacement of the surface. The applicant has found that optical heterodyning produces an inadequate signal for measuring vibrations from surfaces that are diffusely reflective such as the protective tiles of the space shuttle orbiter.

It is thus an object of the invention to provide a nondestructive evaluation method and apparatus which includes a non-contacting accusto-optic vibration sensing capability. It is a further object of the present invention to provide a system for remotely measuring vibrations of submicron displacements at frequencies up to 5,000 Hz.

SUMMARY OF THE INVENTION

A method and apparatus are provided for inducing and measuring a vibration in an object. Means are provided for inducing a vibration in an object. A frequency stabilized laser beam apparatus is positioned such that its beam impinges on a vibrating surface of the object in such a way that a significant amount of light reflected from the surface of the object re-enters the laser cavity causing power fluctuations in the lasing mode. The laser device produces a signal representative of such fluctuations. The signal is processed to obtain information about the vibration of the object.

DETAILED DESCRIPTION OF THE INVENTION

Figure 2:
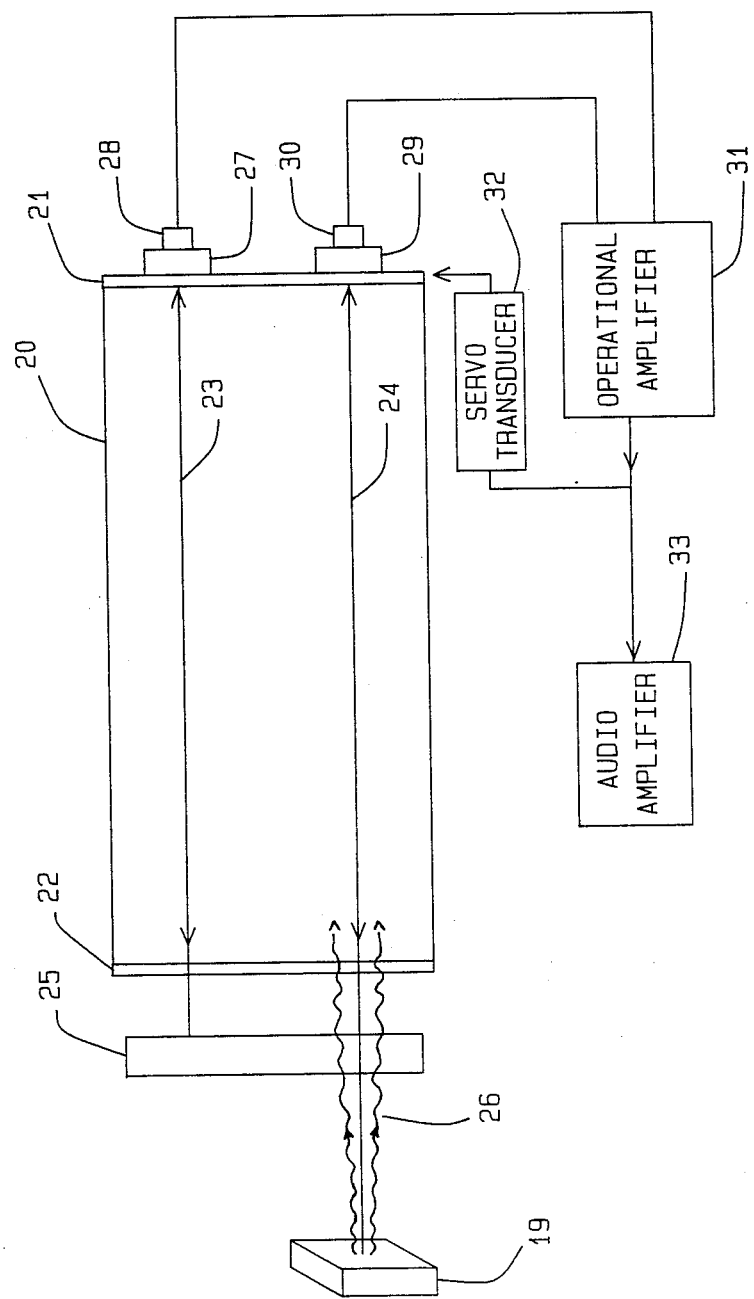
FIG. 2 is a schematic diagram depicting the operation of a stabilized laser.

The present invention employs a commercially available frequency stablized He-Ne laser device. An understanding of the present invention will be facilitated through a description of the operation of such device. The device is based on an alternate mode balance technique, in which the amplitude ratio of two orthogonally polarized beams is held constant by changing the length of the laser cavity 20 by means of servo transducer 32. Refering to FIG. 2, in a laser cavity 20, a lasing medium is appropriately pumped to produce coherent light resonating between mirrors 21 and 22 in the usual manner of a laser. This light is shown in FIG. 2 as two components 23 and 24 which components are orthogonally polarized. Both components pass through the output mirror 22 but only component 24 passes out of the laser device through the output polarizer 25. In the normal operation of the stabilized laser, photodiodes 28 and 30 sense the intensity of beam components 23 and 24 respectively which are passed through to the respective photodiodes by polarizers 27 and 29 respectively. Operational amplifier 31 produces a servo signal related to the relative intensities of beam components 23 and 24. This signal drives servo transducer 32 to adjust the length of the laser cavity 20 to compensate for the thermal and vibrational effects that tend to destabilize the laser. In this way the stabilization servo can maintain a very constant light frequency if the amount of backscattered light allowed to re-enter the cavity is kept to a minimum. Typically, the output of the servo circuits is fed to an audio amplifier 33 as well as to the servo transducer 32. The audio signal may then be used by an operator to achieve the desired minimization of the re-entry of backscattered light. The stability of the laser is very sensitive to the backscattered light and if backscattering is not minimized, the effects of the backscattered light will easily overcome the stabilization servo system. Typically, a retroreflection of less than one percent can cause power fluctuations in the lasing mode of ±20%. It is just this attribute which makes this device a potential vibration detector.

The present invention utilizes a stabilized laser having its output beam, as in FIG. 2, impinging on a vibrating surface 19 and arranged such that a substantial amount of the reflected light is backscattered to re-enter the laser cavity 20. The retroflected light is modulated in phase or Doppler shifted by the vibration of the surface 19. When this reflection re-enters the lasing cavity, it is superimposed on the existing like-polarized component 24 and vectorially sums to produce an amplitude variation that is dependent on the relative phase between the original resonating beam component 24 and the retroreflected beam. This amplified variation is detected by the photodiode 29. The signal from the photodiode 29 is fed to operation amplifier 31 for comparison to the second lasing mode signal of orthoginally polarized component 23 detected by photodiode 27. The resulting error signal is used to drive the tube length servo transducer 32 and the signal that in normal operation would be used to drive the audio oscillator 33 is processed to obtain information about the vibration of object 19.

Essentially this is an autodyne detection system in which the reflective signal containing the vibration information is compared with an unperturbed portion of the original signal. The technique has an inherent limitation when the displacement of the vibrating object is greater than one half of the optical wavelength. In this case, the phase of the retroreflective signal can not be distinguished from a displacement that is smaller in amplitude by one half wavelength. This problem can cause a time dependent variation in the servo output signal. Another problem is amplitude variations in the signal caused by the servo response. Both of these problems are overcome by the novel signal processing elements of the invention as described below.

Figure 1:
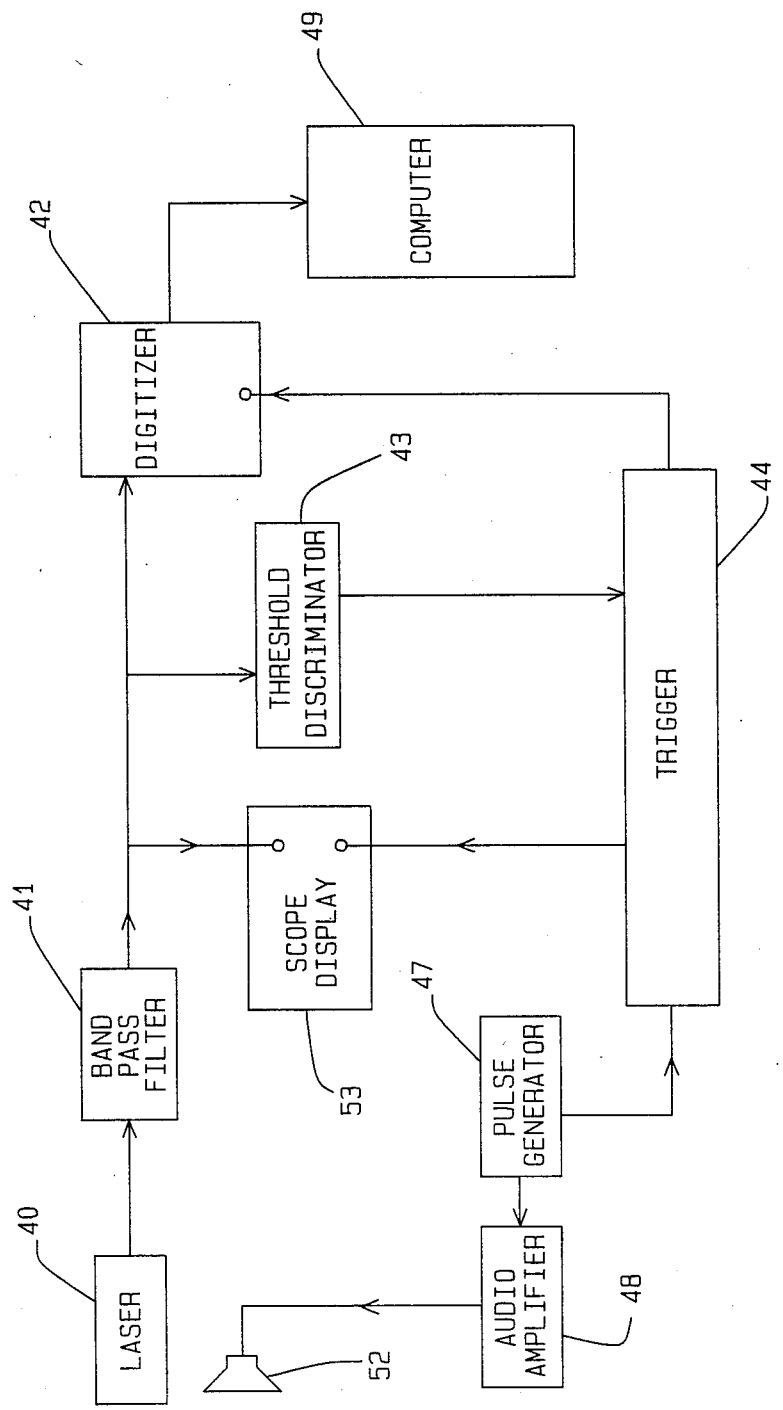
FIG. 1 is a schematic diagram depicting the elements of a preferred embodiment of the present invention.

With reference to FIG. 1, vibration data is collected by focusing a commercially available frequency stabilized laser 40, such as a *Lab for Science, Model* 200, on the surface of the orbiter tile or other object to be evaluated (not shown). Vibrations in the tile are driven with a standard audio loudspeaker 52 placed from 0.5 to 2 meters from the object. In order to excite a broad band of resonance modes in the tile simultaneously, pulse generator 47 produces an audio signal with a square wave pulse of 100 microsecond duration. Such a pulse (which sounds like a brief click) has a Fourier Transform with frequency components from 40 to 10,000 Hz after amplification by audio power amplifier 48. When a tile is excited by this signal, it undergoes a transient oscillation with a peak amplitude on the order of 0.1 to 3.0 micrometers which damps out in less than 50 ms, depending on the amplitude of the excitation and the characteristics of the tile. As discussed above, this oscillation of the tile causes a phase shift in the light scattered off the surface. An appropriate lens system (not shown) is used to collect as much of the scattered light as practical and direct it back into the lasing cavity of the laser 40.

Figure 3:
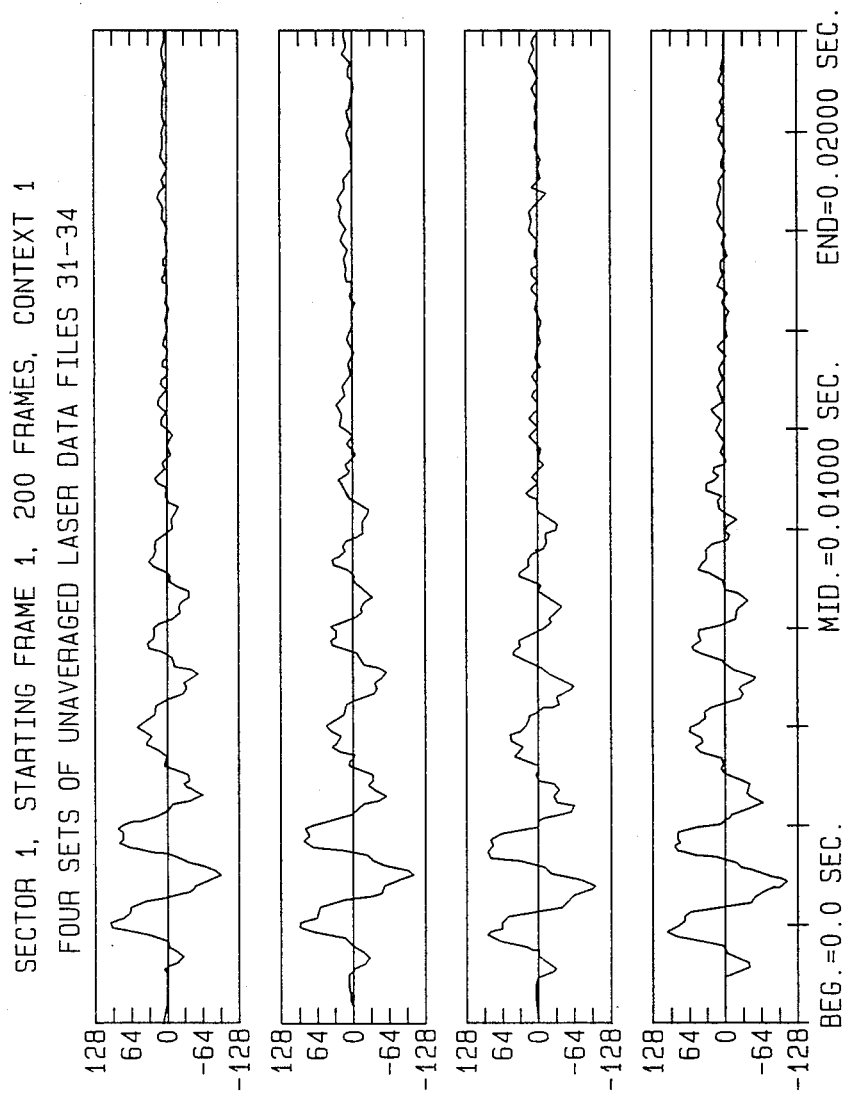
FIG. 3 includes four graphs of displacement vs. time data generated by the invention demonstrating the reproducibility of the measurement.

The servo error signal of the stabilized laser 40 contains the vibration information. The signal is filtered by a band pass filter 41 prior to being fed to computer means 49 for processing. Computer means 49 used by applicants is a portable PDP 11/73 workstation. If the raw data were collected as is with no further processing or discrimination, variations caused by the displacements greater than one half wavelength of light would be observed as phase inversions or amplitude variations in the digitized signal. To avoid these problems, a threshold condition is imposed in that the computer 49 is programmed to not accept a signal unless it has a peak which crosses a given threshhold within a tightly defined time gate. In simplified terms, this translates to only accepting signals that are of similar amplitude and phase. In implementation, the digitizer 42 is told by the software to begin digitizing and wait for a stop trigger. When threshold discriminator 43 senses the appropriate data values it enables the trigger 44 and instructs the digitizer 42 to store the data. A specified pre-trigger sampling range is defined so that the beginning of the event (with occurs before the stop trigger is generated) can also be collected. With an excitation rate of 10 "clicks" per second and the computer response time of less than 60 ms, data acquisition proceeds rapidly. FIG. 3 shows four representative data sets collected with this technique. The reproducibility of the measurement of the transient vibration is evident. To further insure accuracy, an additional step of averaging 25 separate data acquisitions is taken. That is, the software averaged the data from 25 separate events or clicks before storing the data.

Figure 4:
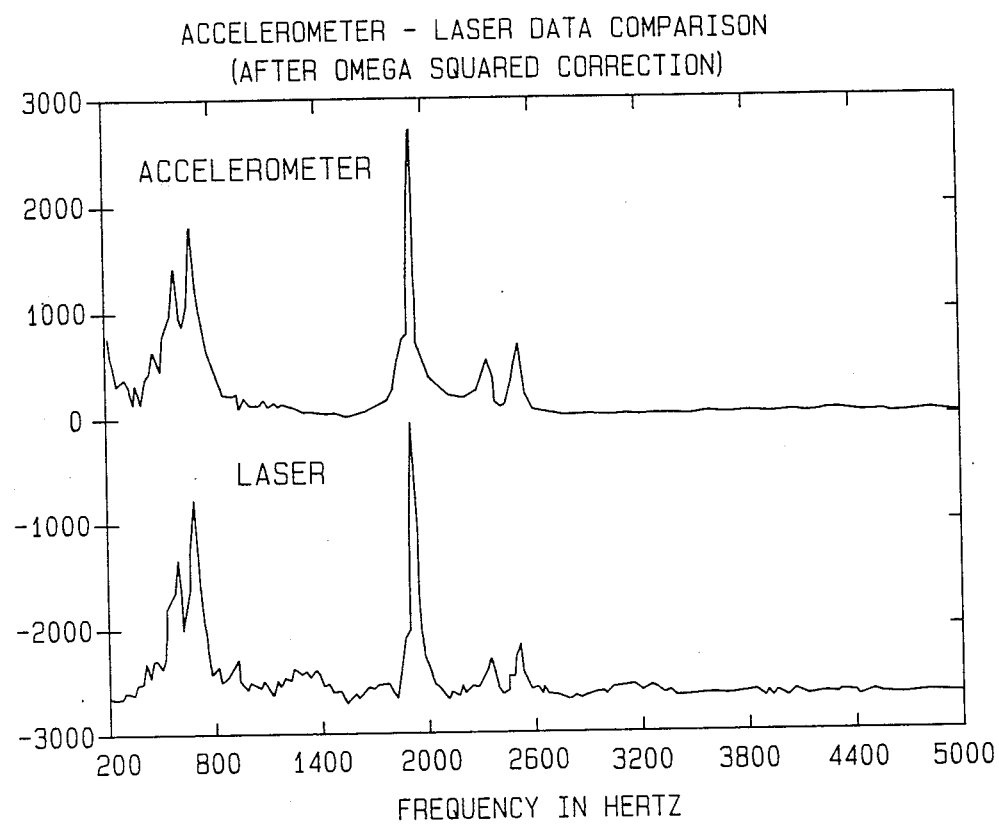
FIG. 4 includes two graphs representing frequency spectra for a vibrating structure one of which is obtained by a means of conventional accelerometer and one by means of the present invention.

Having established the basic reproducibility of the stabilized laser measurement, additional experiments were undertaken to compare the sensor response to more conventional devices such as the accelerometer. Data from simultaneous measurements with an accelerometer and the stabilized laser were Fourier Transformed and the two resulting spectra are compared in FIG. 4. Since the accelerometer is an accelleration sensor and the present laser sensor measures displacement, the acclerometer spectra was divided by the square of the frequency for a corrected comparison with the stabilized laser data. This plot clearly verifies that the laser sensor is measuring displacement and is in good agreement with a known and calibrated source.

It will be apparent to those skilled in the art upon examination of the above description of the preferred embodiment of the present invention, that many modifications and changes in the above embodiment may be made without transcending the scope of the invention. The foregoing description is considered illustrative only of the principles of the invenion and it is not intended to limit the invention to the exact construction or processes shown and described. Accordingly, suitable modifications in equivalence may be resorted to within the scope of the invention as defined by the claims that follow.

The embodiments of this invention in which an exclusive property or privilege is claimed are defined as follows:

1. An apparatus for evaluating a structure comprising:
   means for exciting resonant vibrations in a structure to be evaluated;
   stabilized laser means having a laser cavity capable of producing an output laser beam and an electrical signal related to the phase and frequency of light backscattered into said laser cavity, said laser means oriented such that said output laser beam impinges on the vibrating structure to be evaluated and scatters therefrom;
   means for directing a substantial amount of the laser light scattered from said structure back into said laser cavity to generate an electrical signal;
   means for processing said signal to obtain information related to the vibrations excited in said structure to be evaluated.

2. The apparatus of claim 1 wherein said means for exciting vibrations comprises means for producing a sound pulse having a broad band of frequency components generally in the range of 20 to 20,000 Hz and directed toward the remote structure to be evaluated.

3. The apparatus of claim 1 wherein said laser means comprises a frequency stabilized helium-neon laser.

4. The apparatus of claim 2 wherein said laser means comprises a frequency stabilized helium-neon laser.

5. The apparatus of claim 1 wherein said means for processing said signal comprises:
   computer means for controlling said signal processing and for storing data related to the vibrations excited in said structure to be evaluated;
   digitizer means for digitizing said electrical signal;
   trigger means for instructing said digitizer means to load said digitized data in said computer means; and
   threshold discriminator means for determining that the amplitude of said electrical signal has a peak which passed a predetermined threshold within a predetermined time frame relative to the initiation of said vibration and tripping said trigger means when such determination is made.

6. The apparatus of claim 5 wherein said laser means comprises a frequency stabilized helium-neon laser.

7. The apparatus of claim 5 wherein said means for exciting vibrations comprises means for producing a sound pulse having a broad bond of frequency components, generally, in the range of 20-20,000 Hz and directing said sound pulse generally toward the remote structure to be evaluated.

8. The apparatus of claim 7 wherein said laser means comprises a frequency stabilized helium-neon laser.

9. A method for evaluating a structure comprising the steps of;
   exciting resonant vibration modes generally in the range of 20 to 20,000 Hz in a structure to be evaluated;
   directing the output beam of a frequency stabilized laser having a servo output signal so that said laser output impinges on the surface of the vibrating structure to be evaluated and is scattered therefrom;
   directing a substantial amount of the laser light scattered from said structure surface back into said laser means to generate a signal at said servo signal output;
   processing said signal to obtain information representative of the vibrations in the structure to be evaluated.

10. The method of claim 9 wherein said exciting of resonant vibration modes further comprises the steps of producing a sound pulse with a broad band of frequency components generally within the range of 20 to 20,000 Hz and directing said sound pulse generally towards the structure to be evaluated.

11. The method of claim 10 wherein said processing of said signal further comprises the steps of;
   continuously digitzing said signal;
   descriminating said signal to determine whether said signal has a predetermined threshold value within a predetermined time gate;
   storing said digitized signal in data storage means when said threshold conditions are determined to have been met.

* * * * *